(No Model.) 6 Sheets—Sheet 1.
W. MASON.
MACHINE FOR POLISHING CARTRIDGE SHELLS.
No. 327,290. Patented Sept. 29, 1885.
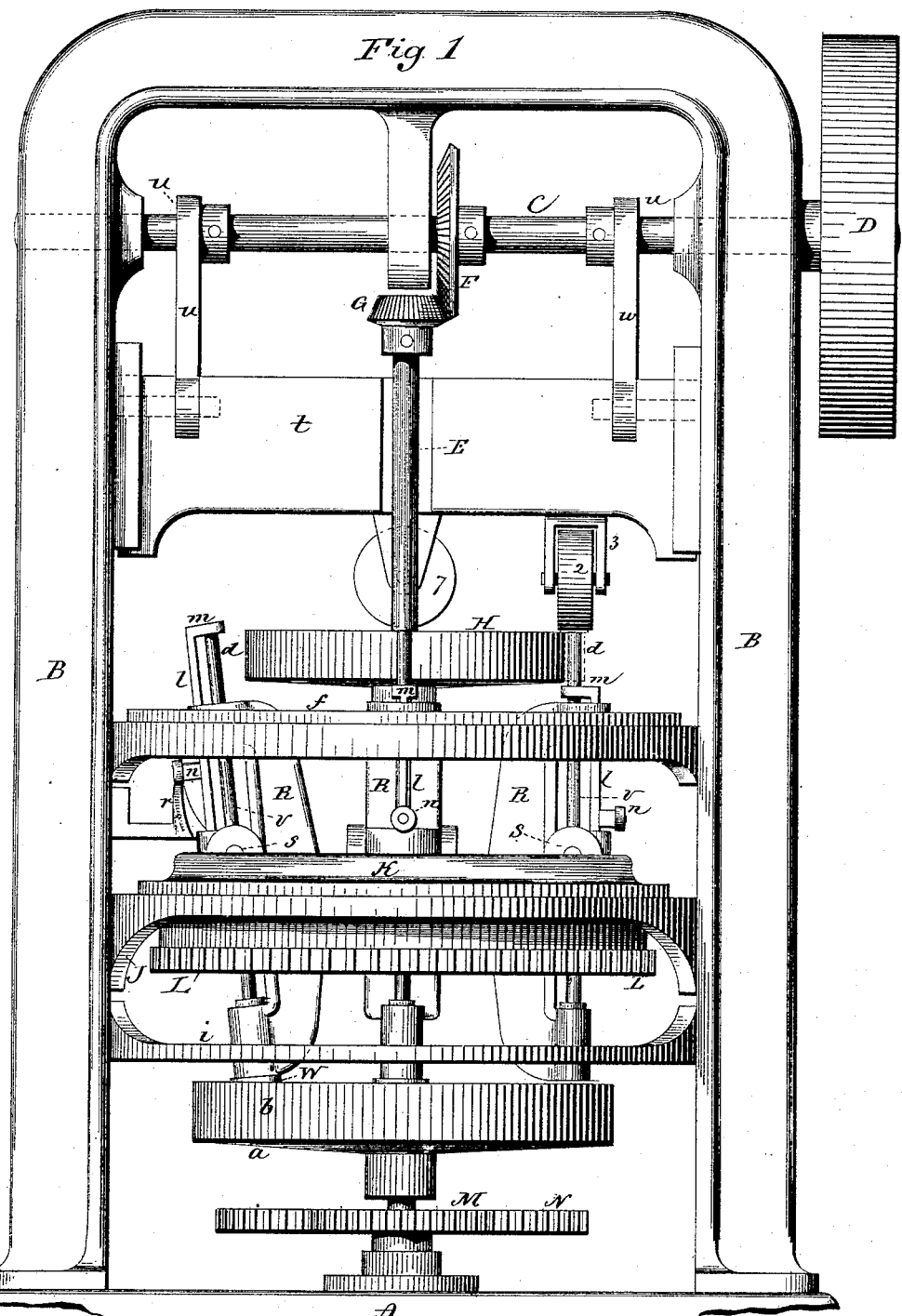

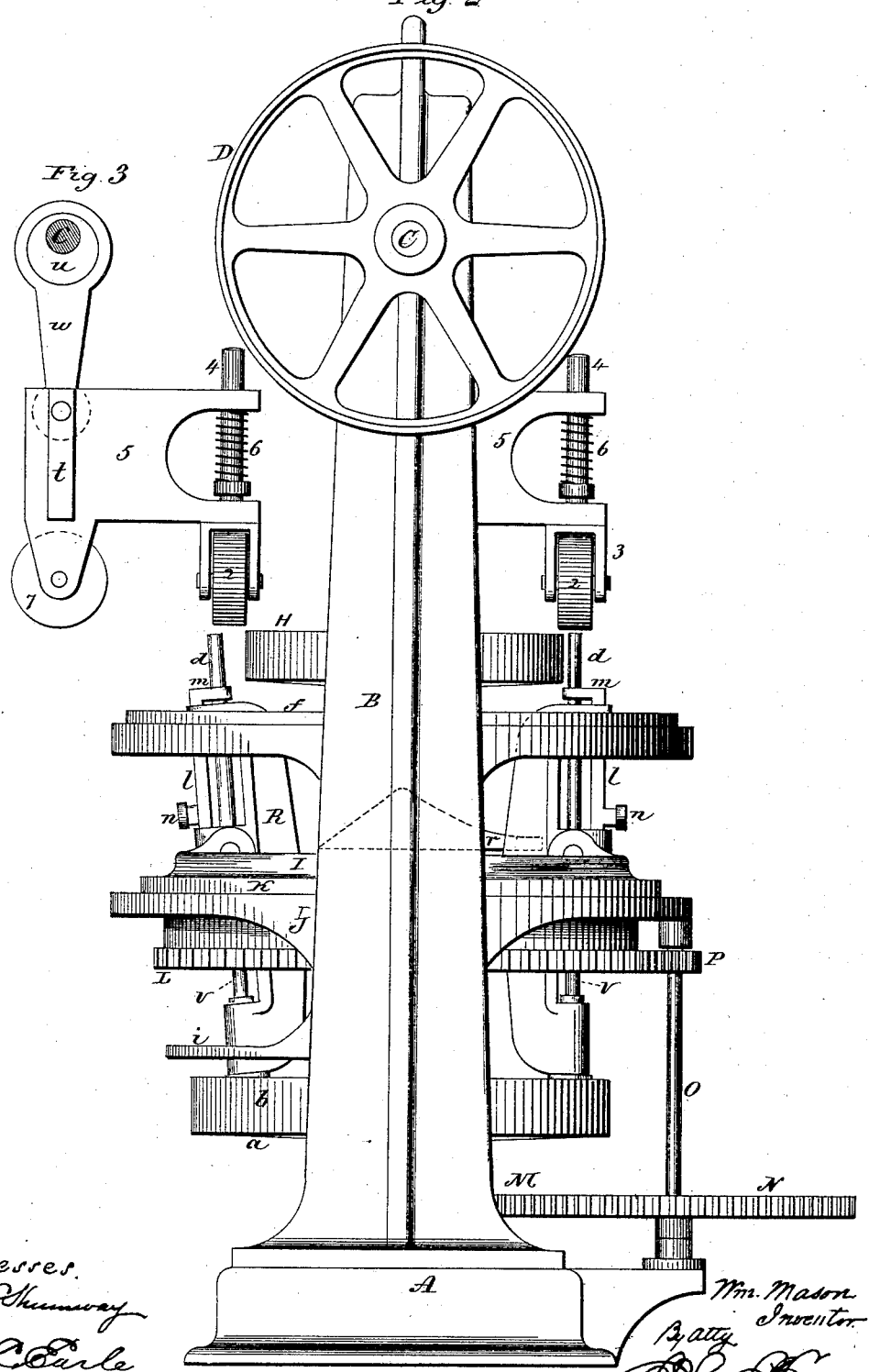

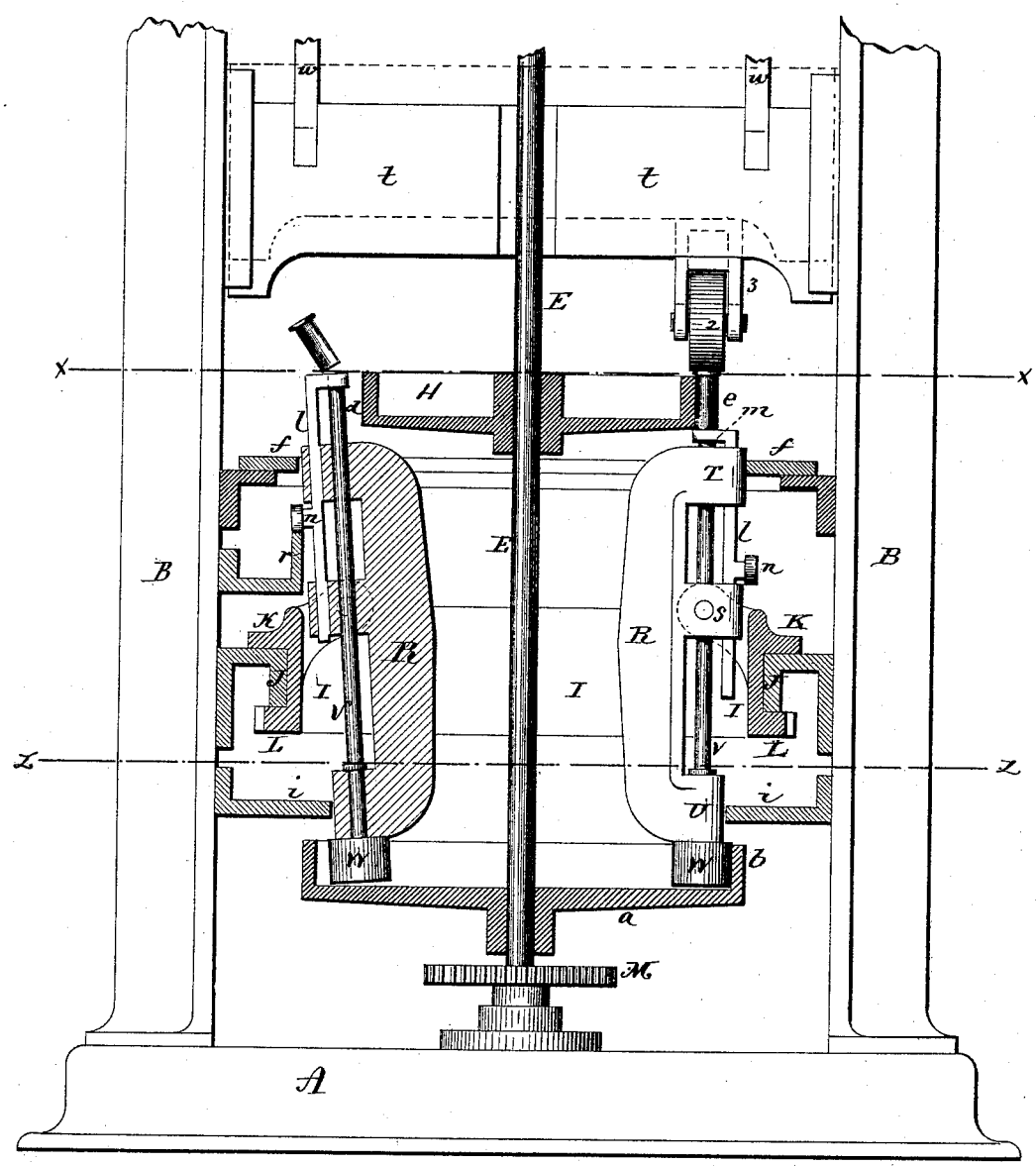

(No Model.) 6 Sheets—Sheet 4.

W. MASON.
MACHINE FOR POLISHING CARTRIDGE SHELLS.

No. 327,290. Patented Sept. 29, 1885.

(No Model.) 6 Sheets—Sheet 5.
W. MASON.
MACHINE FOR POLISHING CARTRIDGE SHELLS.

No. 327,290. Patented Sept. 29, 1885.

(No Model.) 6 Sheets—Sheet 6.
W. MASON.
MACHINE FOR POLISHING CARTRIDGE SHELLS.
No. 327,290. Patented Sept. 29, 1885.
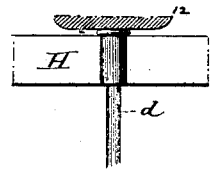
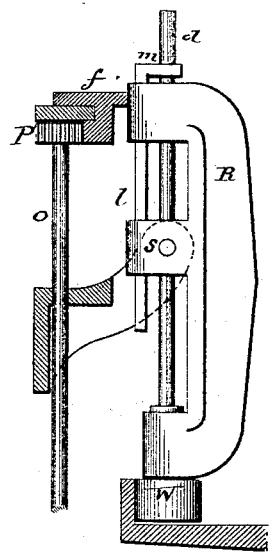
Witnesses.
J. W. Shumway
Fred C. Earle
Wm. Mason,
Inventor.
By Atty
John O. Earle
N. PETERS. Photo-Lithographer, Washington, D. C.

UNITED STATES PATENT OFFICE.

WILLIAM MASON, OF NEW HAVEN, CONNECTICUT, ASSIGNOR TO THE WINCHESTER REPEATING ARMS COMPANY, OF SAME PLACE.

MACHINE FOR POLISHING CARTRIDGE-SHELLS.

SPECIFICATION forming part of Letters Patent No. 327,290, dated September 29, 1885.

Application filed March 16, 1885. (No model.)

*To all whom it may concern:*

Be it known that I, WILLIAM MASON, of New Haven, in the county of New Haven and State of Connecticut, have invented a new Improvement in Machines for Polishing Cartridge-Shells; and I do hereby declare the following, when taken in connection with accompanying drawings and the letters of reference marked thereon, to be a full, clear, and exact description of the same, and which said drawings constitute part of this specification, and represent, in—

Figure 5:
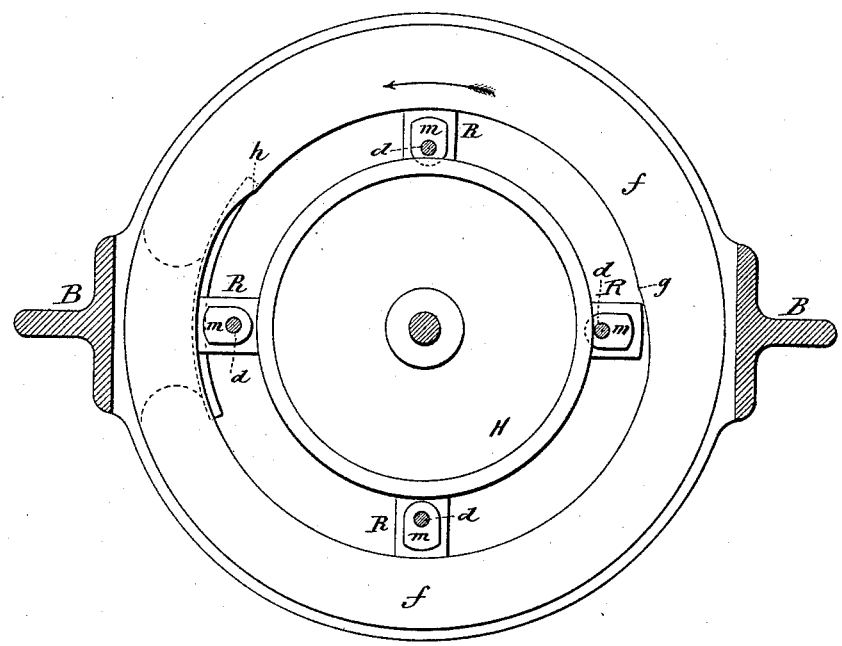
Figure 6:
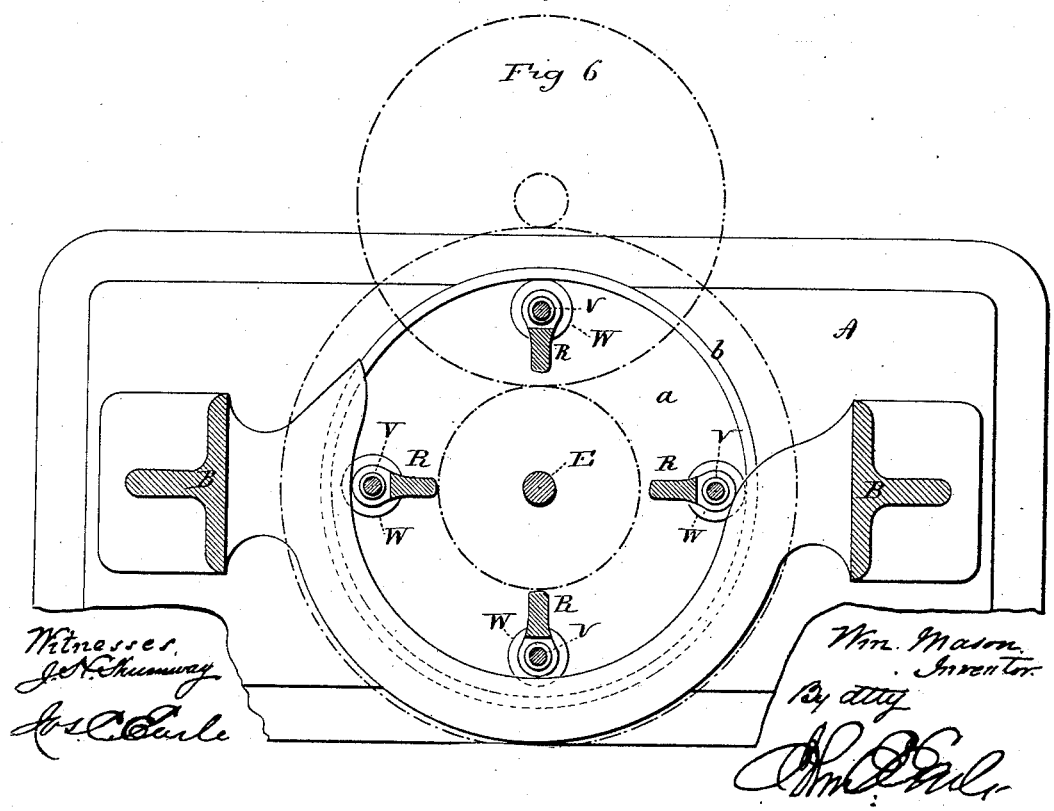
Figure 7:
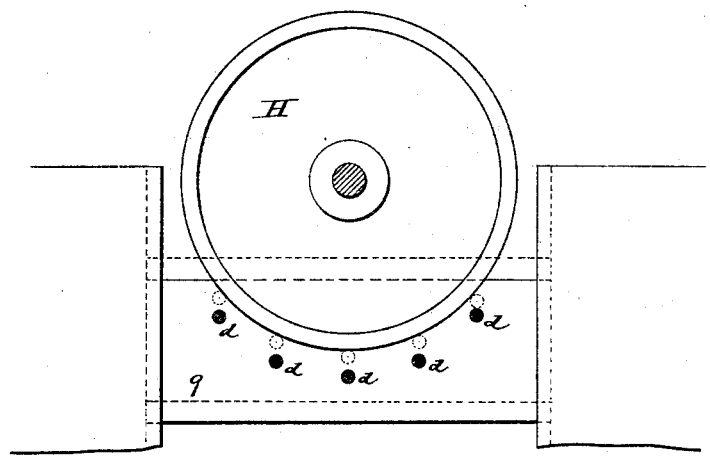

Figure 1, a front view of the machine; Fig. 2, a side view of the machine; Fig. 3, a detached view of the slide $t$, showing the polishing-wheels as arranged for polishing the head, the one adapted for vertical self-adjustment, the other without such adjustment; Fig. 4, a front view in partial vertical section; Fig. 5, a horizontal section above the polishing-wheel $h$ on line $x\ x$; Fig. 6, a horizontal section on line $z\ z$; Fig. 7, a modification in the arrangement of the shafts carrying the cartridge-shells; Fig. 8, a modification in the shape of the face of the polishing-wheel; Fig. 9, a modification showing the polishing device for the head of the shell as stationary; Fig. 10, a modification in the radial movement of the holders.

This invention relates to a machine for polishing the exterior of cartridge-shells, the object being the construction of a machine which, successively receiving cartridge-shells, may polish the surface of the body of the shell and the heads, and when so polished deliver the finished shell from the machine; and the invention consists, principally, in a revolving polishing-wheel, combined with carriers adapted to receive the shell to be polished, impart to it a revolution while the body of the shell is presented to the said polishing-wheel, and also having combined therewith a polisher which, during the passage of the shell through the machine, will polish the head, and as more fully hereinafter described.

A represents the bed or base of the machine, upon which stand two parallel uprights, B B, connected across at their upper ends.

C is the driving-shaft, arranged in suitable bearings horizontally across the uprights, and to which a driving-pulley, D, or other device is fixed, by which power may be communicated to the machine.

E is a vertical shaft arranged centrally, or nearly so, between the uprights. It receives revolution from a bevel-gear, F, on the driving-shaft, working into a pinion, G, on the vertical shaft.

H is a wheel arranged on the vertical shaft E, and so as to revolve in a horizontal plane, its periphery being provided with any suitable polishing coating or preparation whereby metal brought into contact therewith will receive a polishing effect.

I is a ring arranged in a plane parallel with the wheel H, concentric with the shaft and below said wheel H, and is supported on a bearing, J, by an outwardly-projecting flange, K, above, and a like flange, L, below, and so as to revolve on the bearing J in a path concentric to the shaft E. It receives rotation from a gear, M, at the lower end of the vertical shaft E, working into a gear, N, on a vertical counter-shaft, O, carrying a pinion, P, which in its turn works into teeth on the periphery of the flange L, the proportion of the several gears being such that the velocity with which the ring rotates is very considerably less than that of the vertical shaft E.

Upon the inner side of the ring I hangers R are hung, each upon a pivot, S, here represented as four in number. These hangers are adapted to swing each in its own vertical plane, the several planes radiating from the center. The hangers R are constructed with a bearing, T, at the upper end, and a like bearing, U, below. In the bearings of each of the hangers a shaft, V, is arranged, and so as to revolve freely each in its own bearings. At the lower end each shaft V carries a pulley, W.

On the vertical shaft E a wheel, $a$, is fixed below the pulleys, W, and so as to revolve with the shaft. This wheel extends outside the several pulleys W, and is constructed with an upwardly-turned flange, $b$, the inner periphery of which corresponds to the several pulleys, and so that as the wheel $a$ revolves the inner surface of the flange $b$ will work against the periphery of the pulleys W, and impart a corresponding revolution to the shaft V. The several shafts extend above the upper end of the hangers, to form studs or pins $d$. The diameter of these studs $d$ corresponds to the internal diameter of the shell to be polished, and their path of movement under the action of the ring I is around the polishing-wheel H, and so that if a shell be applied to the stud, as indicated at $e$, Fig. 4, the shaft V carrying the stud revolving under the action of the wheel $a$, and the hanger R turned to bring the shell into contact with the surface of the polishing-wheel H, which is also revolving, and in the same direction as the shell, the surface of the shell below the head will be polished; but if the hanger R be turned so as to take the stud $d$ from the polishing-wheel H, as indicated at the left in Fig. 2, then the shell is removed from contact with the wheel. Such movement of the hangers R to take the studs from the wheel, and then to present them thereto, is necessary in order to introduce and remove the shell; hence a rocking movement is imparted to the hangers, as from the position at the right in Fig. 4 to that seen at the left in the same figure.

The rocking movement is imparted to the hangers by a ring, $f$, at their upper ends, fixed to the frame, and so that at the upper end the hangers may run upon the inner surface of the said ring. Throughout a portion of the inner surface of the ring $f$, as from $g$ to $h$, it is concentric with the wheel H, and in such relation thereto that while the hangers are passing from the point $g$ to $h$ in the direction indicated by the arrow, their upper ends will be turned inward toward the wheel H, and so as to present the cartridge-shell to the action of the surface of the wheel H; but from the point $h$ around to the point $g$ in the same direction the surface is concentric with the wheel H, but on a circle of larger diameter, and as seen in Fig. 5, and so that passing from $h$ to $g$ the upper ends of the hangers are permitted to turn outward, as indicated at the left in Fig. 4. In Fig. 5 one of the hangers is shown as just running onto the reduced diameter. The second shows the hanger as working upon that reduced diameter, the third and fourth as having passed onto the larger diameter, so as to take the studs away from the wheel H.

To insure the outward movement of the hangers as they come onto the enlarged internal diameter of the ring $f$, a corresponding flange, $i$, is arranged below and to work against the lower end of the hangers R during their passage from $h$ to $g$ on the cam—that is, through the larger diameter—(said flange seen in Fig. 6) and so that as the hangers pass from the smaller diameter at $h$ of the ring above, their lower ends will strike and ride upon the flange $i$ below, and turn the upper ends of the hangers outward, as indicated at the left in Fig. 4, and as also indicated in Fig. 6.

As the upper ends of the hangers R are forced inward, it brings the pulley W below into strong frictional contact with the inner surface of the flange $b$ on the wheel $a$, and so that revolution of the wheel $a$ will impart a rapid revolution to the shaft V and the cartridge which it carries at its upper end; but as the upper ends of the hangers are turned outward, as before described, the pulley W is thrown inward away from such frictional contact with the flange $b$, and as indicated at the left in Fig. 4, so that the forced revolution of the shaft V is stopped.

While the hangers and their shafts are passing through that portion of their movement in which they are held away from the wheel H, a shell is applied to each stud or shaft, which is in its turn carried around, presented to the polishing-wheel, its surface polished, and then, leaving the wheel by the rocking movement of the hanger which carries it, the shell is removed and another applied, and so continuing, one polished shell is removed and an unpolished shell applied to each shaft.

To make the removal of the shells automatic, I arrange in each of the hangers R a slide, $l$, carrying an arm, $m$, which extends inward and surrounds each stud $d$, as seen in Figs. 4 and 5. In its down position, as seen at the right in Fig. 4, the arm $m$ stands below the mouth of the shell on the stud. On each slide is a projection, $n$, preferably provided with an anti-friction roll, and at one point in the path of movement of the said projections a fixed cam, $r$, is arranged, (see Figs. 1 and 2,) upon which said projections will run, and the inclination or rise of the cam is such that as the hangers R continue their rotation the slide $l$ will be raised, as indicated at the left in Figs. 1 and 4, and in such rising will force the shell from the stud above it, as indicated in Fig. 4, the shell being thereby discharged from the machine. The position of the cam $r$ is such that this discharge occurs soon after the hanger is thrown outward, as before described, and then during the remainder of the movement of the hanger, and in this out position, another shell may be applied. This operation polishes the surface of the body of the shell, and may include the edge of the flange, the polishing-wheel having its surface constructed to correspond to the surface of the body, and so as to embrace the flange also, as seen in Fig. 8.

To polish the surface of the head of the shell during the operation of the polishing of the body, I arrange a slide, $t$, on guides between the uprights, and impart to it an up-and-down reciprocating movement by eccentrics $u$ on the driving-shaft, through connecting-rods $w$, and which, as the shaft C revolves, causes the slide $t$ to move up and down, as indicated in broken lines, Fig. 4. On this slide I arrange one or more wheels 2, carried in a stirrup, 3, on the end of a vertical spindle, 4, supported in a bracket, 5, extending from the slide $t$, and provided with a spring, 6, the tendency of which is to force the spindle 4 and the pulley it carries downward, but yield to an upward force. These wheels 2 are arranged so that their periphery stands in the path of the shells while traveling in contact with the wheel H.

The plane of the periphery of the wheels 2 is at right angles to the axis of the wheel H as well as of the shafts V while they are presenting the shells to the wheel H, and as seen at the right in Fig. 1. Preferably, I provide a second wheel, 7, like the wheel 2, attached to the slide t in the same manner, this second wheel also being in the path of the shell while working in contact with the wheel H. The slide t rises after it shall have operated upon one shell and then descends before the second approaches. The surfaces of the wheels 2 and 7 are prepared so as to present a polishing-surface, and may be any of the known preparations for this purpose.

The head of the shell revolves in a plane parallel with the axis of the wheels 2 and 7, and, as it passes beneath the said wheels then revolving, it receives from the wheels a polishing effect, which finishes the surface. This may be done by a single wheel, or two or more, the first partly finishing, the second increasing the finish, and so on.

While I prefer to automatically remove the shells as I have described, it will be understood that the operator may remove them by hand.

The shells may be applied to the studs by automatic feeding devices well known in the art to which this invention pertains.

While I prefer to arrange the polishing-wheel 2 upon the slide t, and so as to be raised and lowered, the bracket which carries the wheel may be rigid and the slide dispensed with, the wheel being adapted to the passage of the shell beneath it, and in such contact with the surface as to produce the polishing effect.

The polishing-surface for the head of the shell, which stands in a plane at right angles to the axis of the principal polishing-wheel H, may be a fixed surface instead of a wheel, as seen in Figs. 9 to 12, representing the stationary polisher beneath which the head of the cartridge passes; but I prefer the wheel, as a partial rotation will be imparted to it by each shell as it passes beneath it, and thereby constantly present a new surface. This modification may be considered as the wheel 2 held to prevent its revolution.

I have described the machine as having the shaft E vertical, and causing the polishing mechanism to revolve in a horizontal plane, and prefer such arrangement of the parts; but they may be otherwise arranged, so as to bring the axis horizontal.

I have described the revolving shafts which present the shells to the polishing-wheel as having also a revolution around the polishing-wheel, and prefer this arrangement, as it presents the studs to the operator to apply and remove the shells in the most convenient manner; but the hangers, as seen in Fig. 10, which carry the shafts may be hung in a stationary position. In that case the cam f, which moves the hangers toward the polishing-wheel or permit their movement from it, will receive a rotative movement concentric with the polishing-wheel H, and this rotative movement may be imparted by applying teeth to its periphery and extending the counter-shaft O with its pinion P up to engage the periphery of the flange. Under this arrangement the shafts carrying the shells will have the same rotative movement on their own axis and the same radial movement, as before described.

The arrangement of the hangers of the shafts so that they swing in a radial plane is the best arrangement for them; but the several shafts may be arranged so as to move in parallel planes, say by supporting the several revolving shafts in a slide, 9, (see Fig. 7,) adapted to move toward and from the wheel H, and so that the shafts project above the slide to form the studs d, each of which is adapted to receive a shell, and the shafts arranged in a circle with relation to the wheel H, so that when it is moved up to the polishing-wheel, as indicated in broken lines, all the shells will be presented to the surface, then moved back. The polished shells may be removed and others applied, it only being essential to this feature of my invention that the revolving shafts which carry the shells and present them to the polishing-wheels may have a revolution upon their own axis, and also a movement toward and from the polishing-wheel.

I claim—

1. In a machine for polishing cartridge-shells, the combination of a revolving polishing-wheel, a shaft arranged substantially parallel with the axis of said polishing-wheel and adapted to revolve on its own axis, and also to revolve about the axis of the polishing-wheel, the said shaft constructed to receive and carry a cartridge-shell around said polishing-wheel, and also adapted to be moved toward and from said polishing-wheel, substantially as described.

2. In a machine for polishing cartridge-shells, the combination of a revolving polishing-wheel, a shaft arranged substantially parallel with the axis of said polishing-wheel, and adapted to revolve on its own axis, and also to revolve about the axis of the polishing-wheel, the said shaft constructed to receive and carry a cartridge-shell around said polishing-wheel, and also adapted to be moved toward and from said polishing-wheel, with a second polishing surface at right angles to the axis of the said polishing-wheel, and beneath which the heads of the shells will pass as they move around the polishing-wheel, substantially as described.

3. The combination of a revolving polishing-wheel, a ring concentric with said polishing-wheel, and arranged to revolve in a plane substantially parallel with the plane of said polishing-wheel, one or more hangers in said ring, a shaft in each of said hangers parallel with the axis of the polishing-wheel, said shafts adapted to receive a rapid revolution, and extended to form studs adjacent to said polishing-wheel, the said studs adapted to receive, hold, and revolve a cartridge-shell, and a cam adapted to impart to said hanger and the shaft it carries a radial movement as the said hanger revolves about the said polishing-wheel, substantially as described.

4. The combination of a revolving polishing-wheel, a ring concentric with said polishing wheel, and arranged to revolve in a plane substantially parallel with the plane of said polishing-wheel, one or more hangers in said ring, a shaft in each of said hangers parallel with the axis of the polishing-wheel, said shafts adapted to receive a rapid revolution, and extended to form studs adjacent to said polishing-wheel, the said studs adapted to receive, hold, and revolve a cartridge-shell, and a cam adapted to impart to said hanger and the shaft it carries a radial movement as the said hanger revolves about the said polishing-wheel, and with a polishing surface at right angles to the axis of the polishing-wheel, and beneath which the said stud carrying a cartridge-shell passes, substantially as described.

5. The combination of the shaft E, polishing-wheel H thereon, the ring I, arranged on bearings concentric with said shaft and adapted to revolve in a plane parallel with said polishing-wheel, one or more hangers, R, hung in said ring and so as to swing in a plane parallel with the axis of the polishing-wheel, a shaft, V, in each of said hangers extended to form studs $d$ adjacent to the surface of the polishing-wheel, a wheel, $a$, fixed to the shaft E, and constructed with a flange, $b$, the shafts in the hanger each provided with a pulley, W, to work upon the surface of the said flange $b$, and a cam adapted to impart to said hangers a vibratory movement to take the said studs toward and from the polishing-wheel, substantially as described.

6. The combination of the shaft E, polishing wheel H thereon, the ring I, arranged on bearings concentric with said shaft, and adapted to revolve in a plane parallel with said polishing-wheel, one or more hangers, R, hung in said ring, and so as to swing in a plane parallel with the axis of the polishing-wheel, a shaft, V, in each of said hangers, extended to form studs $d$ adjacent to the surface of the polishing-wheel, a wheel, $a$, fixed to the shaft E, and constructed with a flange, $b$, the shafts in the hanger each provided with a pulley, W, to work upon the surface of the said flange $b$, and a cam adapted to impart to said hangers a vibratory movement to take the said studs toward and from the polishing-wheel, and a polishing-surface at right angles to the axis of the said polishing-wheel, and beneath which the said studs pass as they revolve around said polishing-wheel, substantially as described.

7. The combination of the shaft E, polishing-wheel H, fixed thereon, the ring I, concentric with said polishing-wheel and arranged to revolve in a plane parallel therewith, one or more hangers, R, hung in said ring, said hangers adapted to receive a vibratory movement in a plane parallel with the axis of said polishing-wheel, a shaft, V, in each of said hangers, extended to form a stud, $d$, adjacent to the surface of the polishing-wheel, each of said studs adapted to receive a cartridge-shell, a slide, $l$, arranged in each of said hangers and adapted to move in a plane parallel with the shaft V, the one end of said slide adapted to stand below the mouth of the shell on the stud, a fixed cam, $r$, in the path of the said slide as it revolves about the axis of the polishing-wheel, the said cam adapted to impart a movement to said slide parallel with the shaft V, and whereby the shell on the stud may be ejected therefrom, substantially as described.

8. The combination of the vertical-shaft E, polishing-wheel H thereon, one or more shafts, V, arranged in supports substantially parallel with the said shaft E and adapted to receive a revolution on their own axis, and a support also adapted to receive a revolution around said shaft and concentric therewith, the said shaft extended to form a stud adjacent to the surface of the polishing-wheel, said stud adapted to receive a cartridge shell, a reciprocating slide, $t$, with one or more polishing-wheels, 2, thereon, said polishing-wheels 2 having their axis at right angles to the axis of the polishing-wheel H and in the path of the head of the shell carried by said stud, substantially as described.

9. The combination of the shaft E, polishing-wheel H, flanged wheel $a\,b$ thereon, the ring I, concentric with said shaft and arranged to revolve in a plane parallel with the plane of the polishing-wheel, hangers R, hung in said ring and so as to revolve therewith around said shaft, each hanger adapted to swing in a plane parallel with the axis of said shaft E, a shaft, V, in each of said hangers, carrying a pulley at its lower end adapted to engage the said flanged wheel, whereby revolution is imparted to said shafts V, each of said shafts extended to form a stud, $d$, adjacent to the periphery of said polishing-wheel, cams $f\,i$, arranged to impart said swinging movement to said hangers, a reciprocating slide, $t$, above said polishing-wheel and arranged to move in a path parallel with the axis of said polishing-wheel, one or more polishing-wheels, 2, hung upon said slide, their working-surface in a plane at right angles to said shaft E and in the path of the head of the shells carried by said studs, substantially as described.

10. The combination of the shaft E, polishing-wheel H, flanged wheel $a\,b$ thereon, the ring I, concentric with said shaft and arranged to revolve in a plane parallel with the plane of the polishing-wheel, hangers R, hung in said ring and so as to revolve therewith around said shaft, each hanger adapted to swing in a plane parallel with the axis of said shaft E, a shaft, V, in each of said hangers, carrying a pulley at its lower end adapted to engage the said flanged wheel, whereby revolution is imparted to said shaft V, each of said shafts extended to form a stud, $d$, adjacent to the periphery of said polishing-wheel, cams $f\, i$, arranged to impart said swinging movement to said hangers, a slide, $l$, in each of said hangers, adapted to move in a plane substantially parallel with the shaft V, the upper end of each of said slides constructed to embrace the projecting stud end of its shaft V, and also constructed with a lateral projection, $n$, with a fixed cam, $r$, in the path of said projections in their movement around the shaft E, substantially as described.

11. In a machine for polishing cartridge-shells, the combination of a revolving polishing-wheel, one or more shafts arranged substantially parallel with the axis of said polishing-wheel, each of said shafts adapted to revolve on its own axis, one end of each of said shafts standing adjacent to the surface of the said polishing-wheel and adapted to receive and hold a cartridge-shell, and said shafts arranged in supports to permit their said revolution on their own axis, and with mechanism, substantially such as described, to impart to said shafts a movement toward and from said polishing-wheel, substantially as described, and whereby the shells which the said shafts carry will be presented to the surface of the polishing-wheel.

WILLIAM MASON.

Witnesses:
DANIEL H. VEADER,
LEE H. DANIELS.